May 18, 1937.    E. BREITLING    2,080,649
RECORDING MACHINE
Filed April 20, 1934    8 Sheets-Sheet 1

May 18, 1937.  E. BREITLING  2,080,649
RECORDING MACHINE
Filed April 20, 1934   8 Sheets-Sheet 4

May 18, 1937.  E. BREITLING  2,080,649
RECORDING MACHINE
Filed April 20, 1934     8 Sheets-Sheet 8

Fig. 7.

2    4    6, Black    8, Red a

| (Old Bal.) $300.00 | | | | |
|---|---|---|---|---|
| Date | Account Nr. | Withdrawal | Deposit | New Balance |
| 12 Au 32 | 14703 a | | | |
| | | | | | b

| (Old Bal.) $300.00 | | | | |
|---|---|---|---|---|
| Date | Account Nr. | Withdrawal | Deposit | New Balance |
| 12 Au 32 | 14703 a | | ***200.00 | |
| | | | | | c

| (Old Bal.) $300.00 | | | | |
|---|---|---|---|---|
| Date | Account Nr. | Withdrawal | Deposit | New Balance |
| 12 Au 32 | 14703 a | | ***200.00 | ***500.00 |
| | | | | | d

| (Old Bal.) $300.00 | | | | |
|---|---|---|---|---|
| Date | Account Nr. | Withdrawal | Deposit | New Balance |
| 12 Au 32 | 14703 a | | ***200.00 | ***500.00 |
| 12 Au 32 | 14703 a | | | | e

| (Old Bal.) $300.00 | | | | |
|---|---|---|---|---|
| Date | Account Nr. | Withdrawal | Deposit | New Balance |
| 12 Au 32 | 14703 a | | ***200.00 | ***500.00 |
| 21 Au 32 | 14703 a | ***600.00 | | | f

| (Old Bal.) $300.00 | | | | |
|---|---|---|---|---|
| Date | Account Nr. | Withdrawal | Deposit | New Balance |
| 12 Au 32 | 14703 a | | ***200.00 | ***500.00 |
| 21 Au 32 | 14703 a | ***600.00 | | ***100.00 |

Inventor
Ernst Breitling
By Knight Bros.
His attorneys

Patented May 18, 1937

2,080,649

UNITED STATES PATENT OFFICE 2,080,649

RECORDING MACHINE

Ernst Breitling, Essen, Germany, assignor, by mesne assignments, to The National Cash Register Co., Dayton, Ohio, a corporation of Maryland Application April 20, 1934, Serial No. 721,572
In Germany April 24, 1933

8 Claims. (Cl. 101—96)

This invention relates to a recording machine equipped with a printing mechanism by which impressions in different colors are made. In machines of this type, when it is desired that the color of the printing be changed, it is customary to use a second inking member having the desired color, and to shift this member in printing position in place of the first member. It has also been customary to use a single inking member carrying different colors on different portions thereof. Such an inking member is commonly seen on typewriters having a two colored ribbon. In such instances it is necessary only to shift the inking member a short distance to allow the printing type to strike one or the other portions as desired.

In all these mechanisms, however, the same printing type come into contact with inking members of different colors, so that the portion of the ink that remains on the type after an impression is taken is mixed with the ink of another color when an impression is subsequently made in this second color. This results in the different inking members gradually taking up another color from the printing types, so that in the course of time the impressions do not appear in colors distinctively different from one another. In order to overcome this drawback, pigment colors might be used instead of aniline colors, since the former soak into the inking member to a smaller extent than the latter. Pigment colors, however, have the disadvantage of not withstanding erasures as well as aniline colors.

The object of the present invention is to prevent not only the complete but also any partial mixture of the various colors on the inking members. In the embodiment shown the printing mechanism comprises an arrangement which prevents any contact of a type carrier with inking members carrying different colors.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

*General description*

The invention is shown as applied to a bookkeeping machine, and in particular to a machine used in banking houses to calculate and record new balances after deposits and withdrawals are made in connection with an old balance. More specifically it is shown as applied to a machine of the character shown and described in applicant's United States Patents 1,792,569 issued February 17, 1931, and 1,899,455 issued February 28, 1933, and 2,052,444 issued on August 25, 1936.

In general the present embodiment of the invention shows double sets of amount printing type wheels situated side by side, with a differently colored inking member cooperating with each set. A table supports a record card and is capable of being shifted in two directions. It is shifted longitudinally for the purpose of line spacing the entries on the card and is tabulated laterally for the purpose of aligning the various entry columns of the card with the set of type wheels that uses the inking member of the desired color.

Appropriate controls are provided so that upon depression of the proper transaction key a given entry will be printed in its proper column and in the appropriate color.

*Detailed description*

Figure 1:
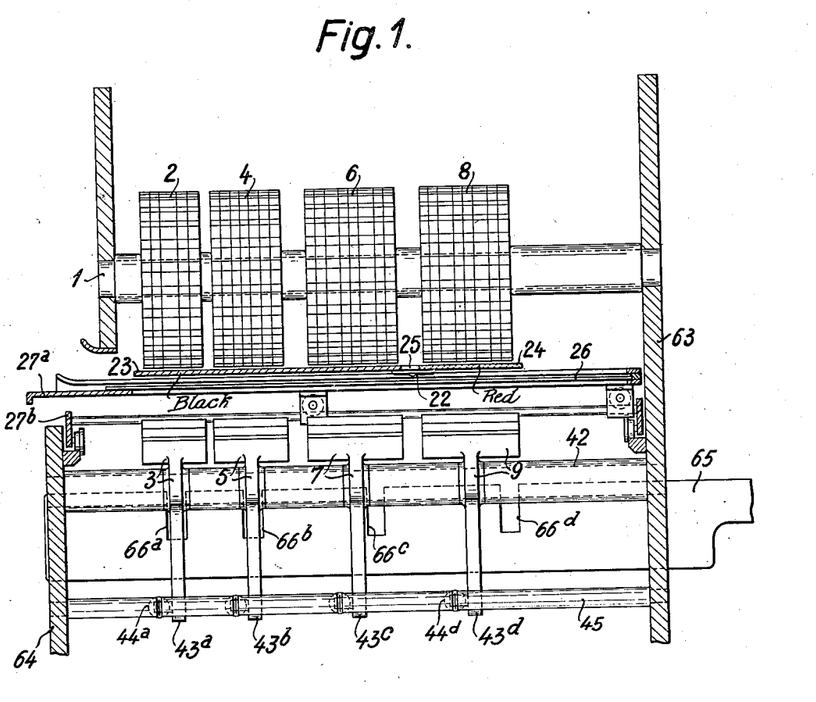
Figure 1 is a view of the type carriers and of the controlling mechanism for the platens.
Figure 2:
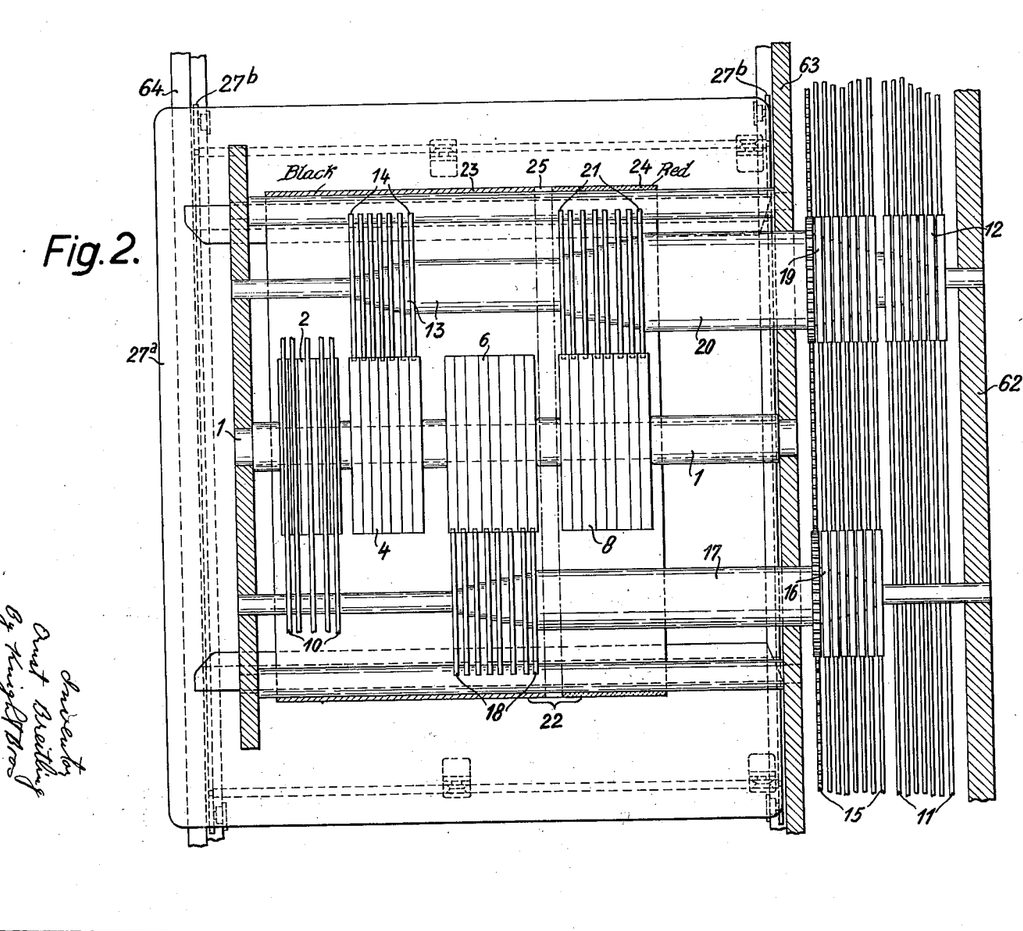
Figure 2 is a top view of the driving mechanism for the type carriers.

The type carriers 2, 4, 6 and 8 shown in Figs. 1 and 2 are adapted to print respectively the date, the account number, and the amounts in black and red. These type carriers are adjusted under control of appropriate differential mechanism such as shown in the aforementioned patents. The motion is transmitted from the differential mechanism through the racks 10 to the date wheels 2, through the racks 11, gear wheels 12, sleeves 13 and gear wheels 14 to the account number wheels 4, and through the racks 15, gear wheels 16 and 19, sleeves 17 and 20, and gear wheels 18 and 21, to the amount type wheels 6 and 8.

It is obvious that a movement of the racks 15 causes a similar and simultaneous setting on the type wheels 6 and 8. As shown in Figs. 1 and 2, an ink ribbon is supported between the type carriers and the record card table 27a. This ribbon is composed of a portion 23 underlying the type carriers 2, 4 and 6, a second portion 25 lying between the two sets of amount type carriers 6 and 8 and a third portion 24 underlying the type carriers 8. For the purpose of illustration we may assume that the portion 23 contains black ink, the portion 24 red ink and the portion 25 no ink.

The machine is provided with four printing hammers 3, 5, 7 and 9 (Figs. 1, 5 and 6) loosely mounted on a rod 42 (Fig. 5) and provided with downwardly extending arms 43a—d, rollers 47a—d, and rearwardly extending arms 48a—d. The hammers are urged to printing position by springs 44a—d extending between their downwardly extending arms 43a—d and a stationary rod 45. The hammers are released for operation and retracted by cams 41a—d secured to a shaft 40 that receives one complete rotation during each operation of the machine. Since it is not desirable that all the hammers be operated during each operation of the machine, a bar 65 (Figs. 1, 5 and 6) is provided to control their operation during the various kinds of operations.

Selective control of printing hammers

As is customary in machines of this character, when an old balance is picked up, it is desirable to print only the date and account number, the amount of the old balance being entered in the machine but not printed. Therefore, when the machine is operated with either the POB (positive old balance) (Fig. 3) or the NOB (negative old balance) key depressed it is desirable to allow only the printing hammers 3 and 5 to print during this operation. Likewise when a deposit or withdrawal is next entered it is desirable to have only the amount printed, and furthermore only in black. Therefore, it is desirable that whenever the machine is operated with one of the keys W (withdrawal) or D (deposit) depressed, only the type hammer 6 be released for printing. When the new balance is taken it is desired that it be printed in black, if it is positive, and in red if it is negative. It is, therefore, desired to release the type hammer 7 during an operation in which the positive new balance key PNB is depressed, and the type hammer 9 during an operation in which the negative new balance key NNB is depressed.

Figure 3:
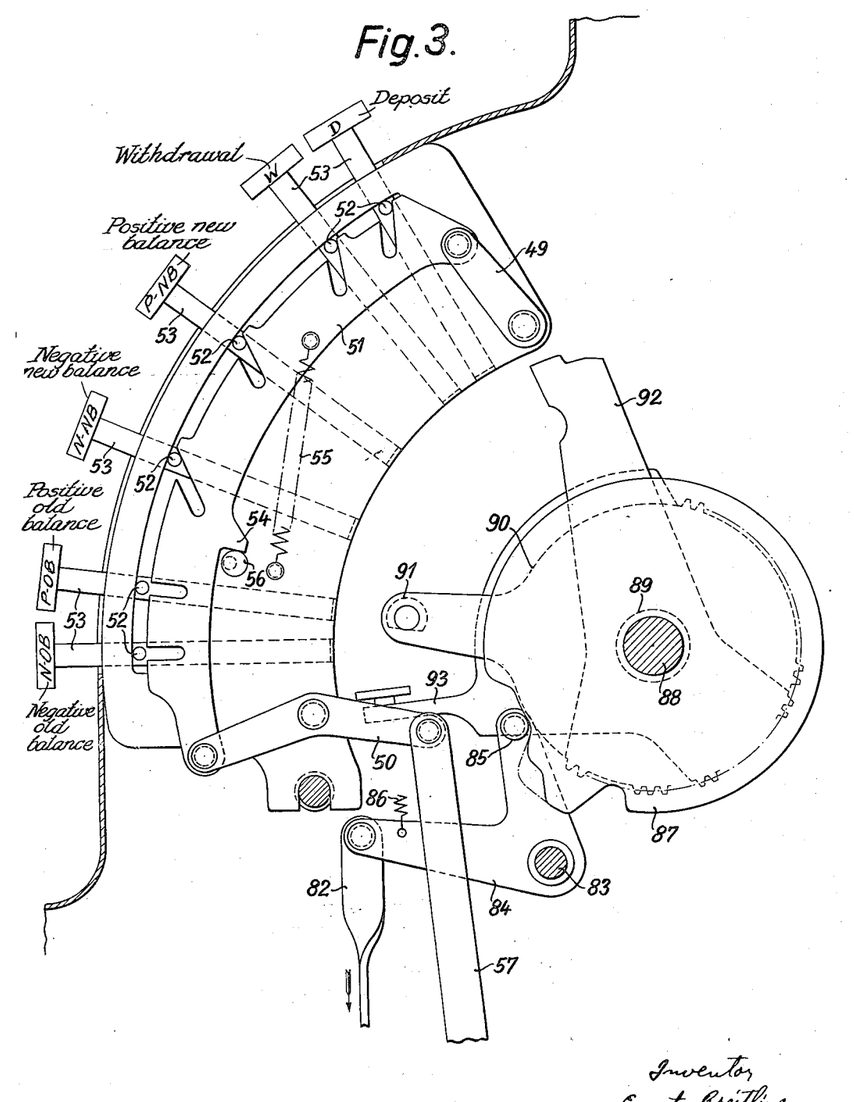
Figure 3 is a view of the balance keybank of the machine with the appurtenant differential actuating mechanism.

To accomplish this selective operation the machine is provided with a slide 51 (Fig. 3) pivoted on an arm 49 and a lever 50 and having six notches along its outer edge. A spring 55 yieldingly holds the slide 51 in its lowermost position, where an ear 54 on the slide rests against a stationary stud 56. A link 57 connects the inner end of lever 50 with a bell crank 59 (Fig. 4) connected to the slide 65 by a pin and slot connection 60, 61. The slide 65 (Figs. 1 and 6) has notches 66a—d cooperating selectively with the rear ends 48a—d of the printing hammers. Referring now to Fig. 3 it will be noticed that when one of the old balance keys POB or NOB is depressed the slide 51 remains stationary, so that the printing hammers 3 and 5 (Fig. 6) are left free to print during the operation. The extensions 48c—d of the printing hammers 7 and 9, however, lie over an uncut portion of the slide 65, so that these hammers will be held in their cocked position.

When a deposit or withdrawal is made by depression of the W or D key, the slide 51 is elevated one step, so that the amount printing hammer 7 may take an impression in black during this operation. It will be observed that one step of movement of the slide 51 is sufficient to bring the notch 66c (Fig. 6) in line with the extension 48c on printing hammer 7.

Likewise since it is desired to operate only the amount printing hammer 7 during positive new balance operations, the slide 51 is so cut that depression of the positive new balance key PNB will raise the slide one step, the same as it is raised by depression of the deposit and withdrawal keys. This of course releases only the amount printing hammer 7 as just explained in connection with these other keys.

The printing of negative new balances, however, should be in red, so that for these operations it is desirable to allow only the printing hammer 9 to operate. The slide 51 is, therefore, so notched that upon depression of the negative new balance key NNB the slide is raised two steps, moving the notch 66d (Fig. 6) under the extension 48d of the hammer 9, and moving the other three notches 66a—c out of alignment with their respective hammers. This allows the amount printing hammer 9 to operate alone during the operation.

Column tabulating control

Figure 7:
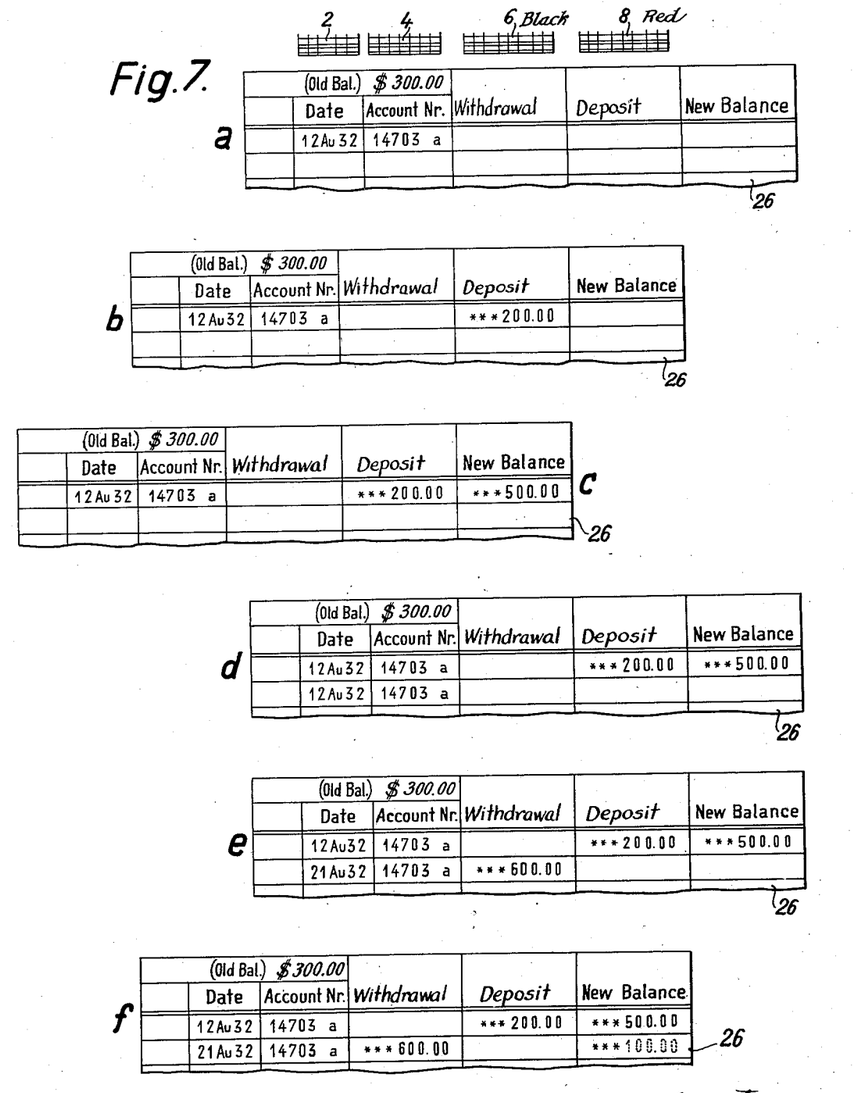
Figure 7 shows an account card as it appears (positions "a" to "f") after each entry is entered thereon.

Fig. 7 shows the record card in the position where the date type wheels 2 and transaction number type wheels 4 are in the proper tabular position for printing, and since withdrawals are printed in black by the amount wheels 6, it is in proper position for this operation also. However, since deposits and positive new balances also must be printed in black by the type wheels 6, operations of the machine involving these transactions must cause the record card to be tabulated one or two steps from the position shown in order that the proper column will lie under the type wheels 6. Since a negative balance must be printed in red by the amount type wheels 8, it is necessary that the record card be shifted one step for such operations. For the purpose of explanation, the "normal" position for the record card and card table will be taken as the position in which it is shown in Fig. 7a. The mechanism to cause such selective shifting will now be described.

Referring to Fig. 3 a pivoted member 90 is differentially set during each operation of the machine, by the differential members 92, 93 through the cooperation of a stud 91 on the member 90 that contacts the inner edges of the two differential members. The differential members are moved toward each other and are controlled in their movement by striking the end of whatever key is depressed in this bank. This differential mechanism is what is commonly known as a "scissors" differential, and is fully shown and described in applicant's prior patents above referred to.

Figure 3A:
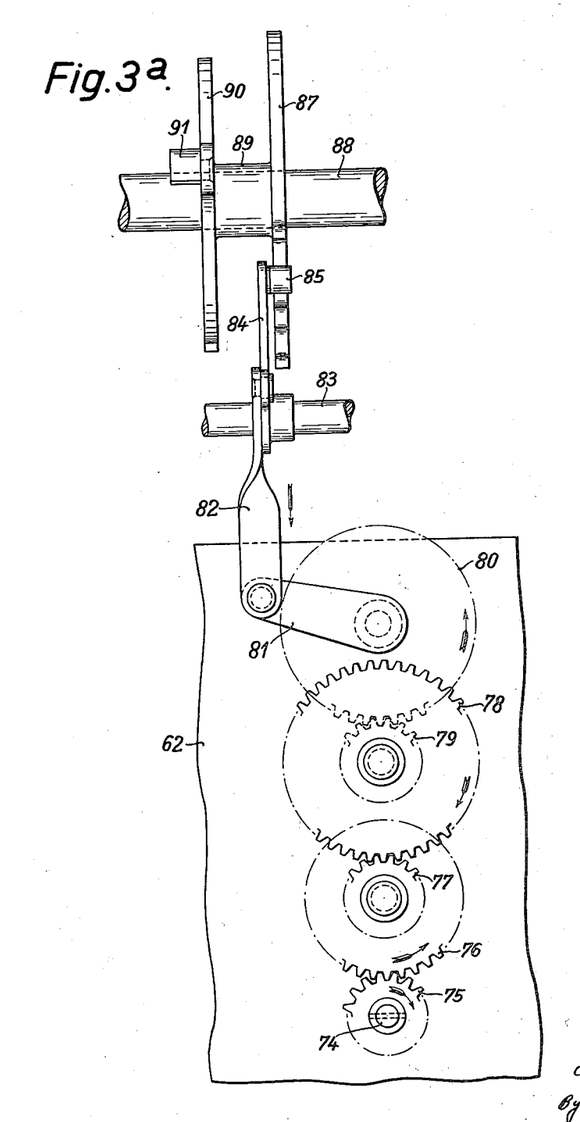
Figure 3a is a view of some of the parts shown in Figure 3, as seen from the front of the machine.
Figure 4:
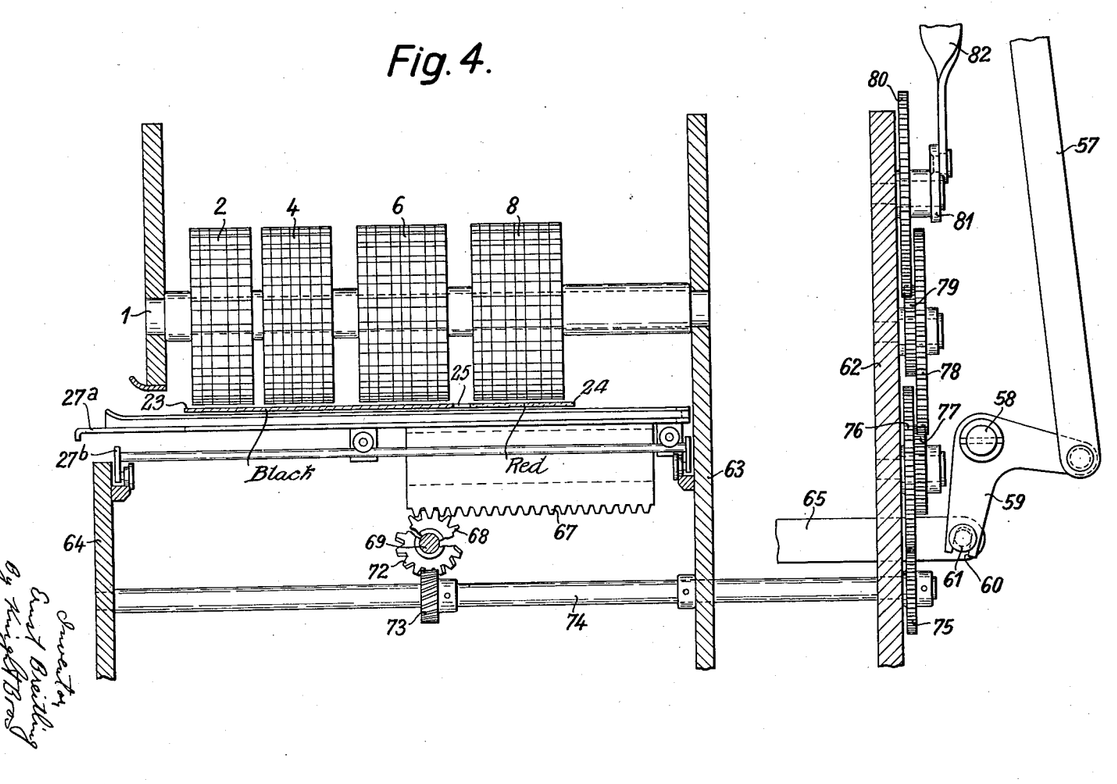
Figure 4 is a view of some of the parts for shifting the printing table.
Figure 5:
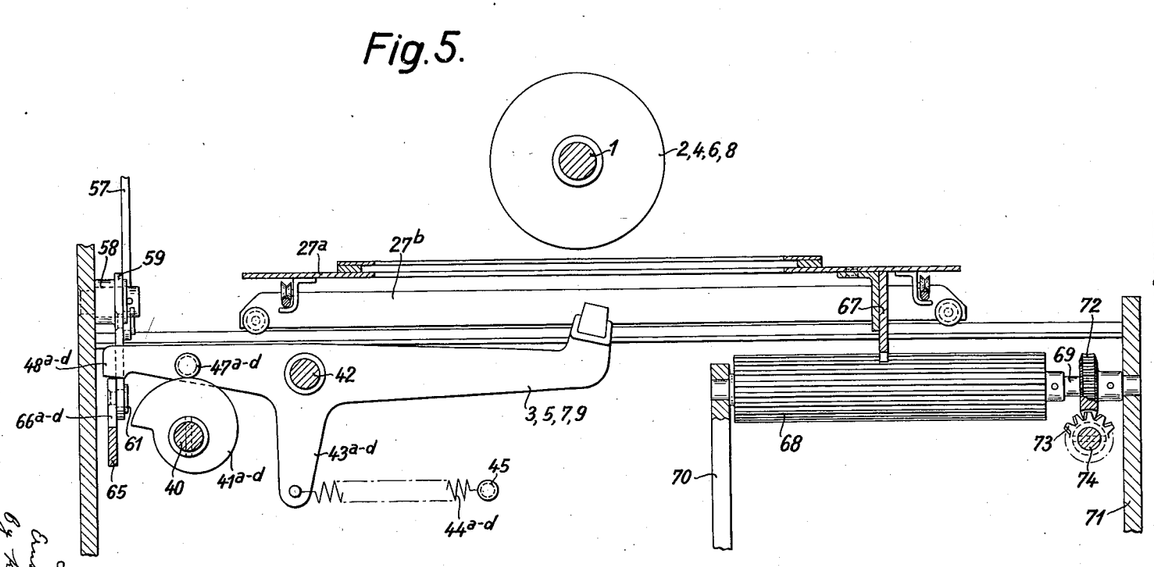
Figure 5 shows the drive for the platens and for the printing table.
Figure 6:
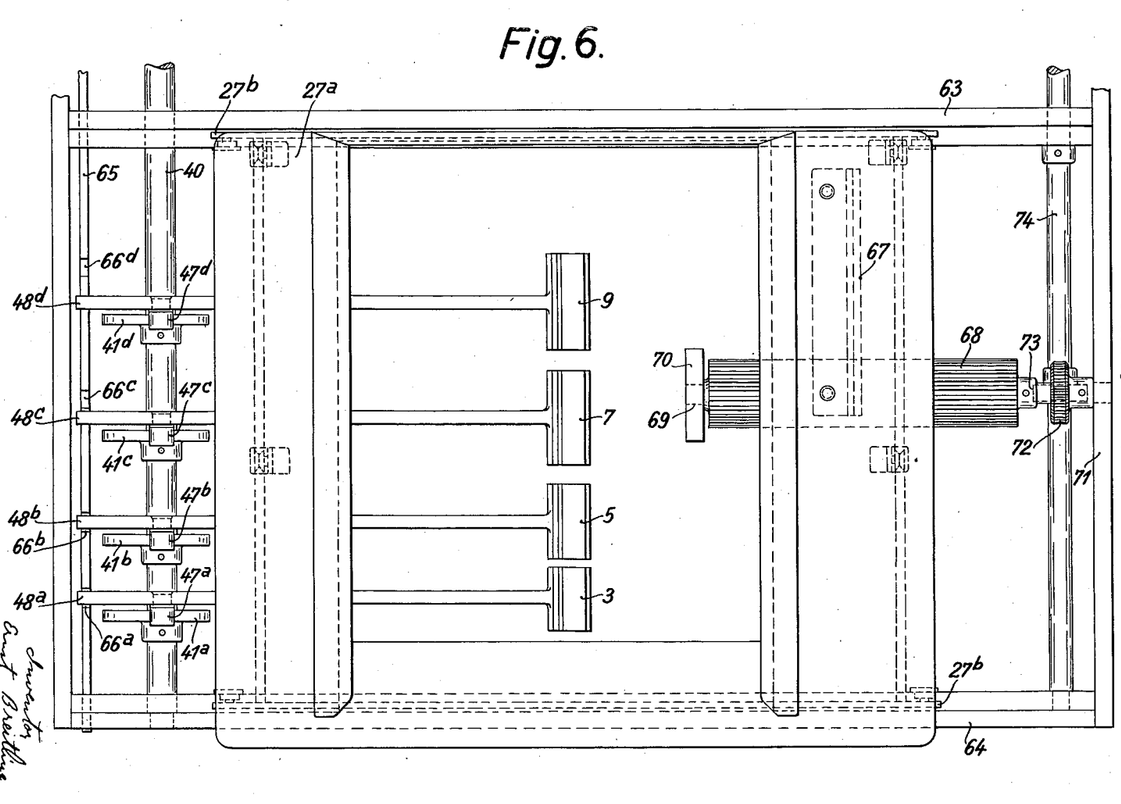
Figure 6 is a top view of the printing table and the control bar for the hammers.

A disk 87 is rigidly secured to the member 90 through a sleeve 89 (see also Fig. 3a). The disk has an outer periphery of irregular formation to cause a differential setting of a bell crank 84 pivoted on a rod 83, said bell crank having a roller 85 held against the irregular periphery of disk 87 by a spring 86. The various differential settings of the bell crank 84 cause corresponding settings to be given the link 82, arm 81 (Figs. 3a and 4), gears 80—75, shaft 74, beveled pinions 72 and 73, shaft 69, to which the gear 72 is secured, elongated pinion 68 (Figs. 5 and 6) and the rack 67 (Figs. 4 and 5). The rack 67 is secured to the upper portion 27a of the table and causes this upper portion to move to the left (Fig. 4), relative to the lower portion 27b that receives movement only in a line spacing direction. Referring to Fig. 3 it will be noticed that, when the parts are in the position shown, the roller 85 is lying in a low spot of the disk, in which position the paper table is in its normal position. It is seen that disk 87 may be rotated so as to remove the roller 85 either one or two steps. This one or two step movement is sufficient to cause the rack 67 (Fig. 4) to move the table either one or two steps, each of which corresponds to a tabular movement of the card as shown diagrammatically in Fig. 7. Fig. 7a shows the card in its normal position, while Figs. 7b and 7c show it in the positions to which it is moved when the roller 85 (Fig. 3) is moved one and two steps.

By inspection of Fig. 3 it will be found that when either of the old balance keys POB or NOB is depressed, and the machine operated, the roller is positioned in a low spot, which allows the record card to remain in normal position (Fig. 7a) for the printing of the date and account number.

When the negative new balance key NNB is depressed, and the machine operated, the roller receives a setting one step above the notch, which tabulates the card one step, so that the negative new balance may be printed in the new balance column in red, by the type wheels 8, as shown by the dotted line entry in the new balance column in Fig. 7f.

When the positive new balance key PNB is depressed, and the machine operated, the disk 87 is so moved that the highest spot thereon contacts the roller 85, in which position the latter is two steps above the notched portion of the disk 87. This causes the record card to move to the tabular position shown in Fig. 7c. In this position the new balance column of the card will be in position to receive an impression in black from the amount type wheels 6.

When the withdrawal key W is depressed, and the machine operated, the roller is positioned in another notch in the disk 87, so that the record card will lie in its normal position. In this position the item is printed in black in the withdrawal column by the black amount type wheels 6, as illustrated in Fig. 7e.

When the deposit key D is depressed, and the machine operated, the roller is positioned on the concentric portion of the disk 87, which is one step higher than the notched portions, which causes the record card to move to the tabular position one step from normal, where the deposit column on the card receives an impression in black from the amount type wheels 6, as illustrated in Fig. 7b.

Referring to Fig. 5 it will be noticed that the pinion 68 is sufficiently long as to allow the record card table 27a and 27b to be shifted in line spacing direction, so that entries may be made from the top to the bottom of the record card. The length of this pinion will of course vary in accordance with the length of the record card used.

*Operation*

When the operator wishes to enter a $200.00 deposit in an account, he must first enter the old balance in the machine. To do this he places the card in the machine, sets up the account number, the old balance, $300.00 for example, depresses the old balance key POB, and operates the machine. The $300.00 is entered on the totalizer in the conventional manner, and the disk 87 is positioned so that the roller 85 lies in the notch where it is shown in Fig. 3. This causes the record card to remain in normal position as shown in Fig. 7a. The slide 51 (Fig. 3) is held in its home position so that the printing hammers 3 and 5 (Fig. 6) print the date and account number while both the amount printing hammers 7 and 9 are restrained. It will be remembered that it is not customary to print old balances. The operator then sets up the $200.00 deposit on the amount keys, depresses the deposit key D and operates the machine. The disk 87 is rotated so that the roller 85 rests on the concentric portion thereof, where it is one step higher than when lying in a notch, causing the card to be moved one tabular position, as shown in Fig. 7b. The depression of the deposit key caused the slide 51 to be raised one step, so that the amount printing hammer 7 (Fig. 6) will be the only hammer to print during this operation. This causes a printing in black of the $200.00 in the deposit column, as shown in Fig. 7b. The operator then takes the new balance by depressing the positive new balance key PNB, which causes disk 85 to rotate to the position where the highest spot thereon contacts the roller 85. This causes the record card to be moved to the second step from normal, which corresponds to the position shown in Fig. 7c. Depression of the positive new balance key causes the slide 51 to be moved one step, so that again the amount printing hammer 7 will take an impression from the amount type wheels 6. This prints the new balance in black in the appropriate column, as shown in Fig. 7c.

If it is now desired to make a withdrawal from this account the operator places the card in the machine and enter the old balance as above. This entry is shown in Fig. 7d. He then depresses the appropriate amount keys for the $600.00 withdrawal, depresses the withdrawal key W, and operates the machine. This causes the roller 85 to be positioned in a low spot on disk 87, so that the card remains in normal position, as shown in Fig. 7e. As the withdrawal key raises the slide 51 one step, the amount hammer 7 is the only one to take an impression. This prints the withdrawal in black in the appropriate column by an impression being taken from the amount type wheels 6, as illustrated in Fig. 7e. Now, since the withdrawal ($600.00) is larger than the old balance ($500.00) the new balance in the machine is negative, so that the operator depresses the negative new balance key NNB for obtaining the new balance. Operation of the machine with this key depressed causes the roller 85 to contact the portion of the disk 87 one step above the notched portions, which causes the card to move to the position shown in Fig. 7f, where the new balance column is in alignment with the amount type carriers 8. The depression of the negative new balance key NNB raised the slide 51 two steps, which caused the notch 66d (Fig. 6) to be moved into alignment with the printing hammer 9, and the other three notches 66a—c to be moved out of alignment with their respective hammers, so that during this operation the printing hammer 9 alone is operated. This causes the printing of the negative new balance in the new balance column in the distinctive red color, as shown by the dotted numerals in Fig. 7f.

It is clear that since the type hammers each cooperate with only one set of type wheels, and since the various sets of type wheels each cooperate with ink ribbon of only one color, there can be no mixing of the colors that would produce indistinct impression.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What I claim and desire to secure by Letters Patent is:—

1. In a printing mechanism for recording machines, two sets of type wheels, means to always simultaneously move the corresponding wheels of each set the same amount so that both sets of wheels always have the same amount standing thereon, an inking means having two portions bearing different colors, the portion of the inking means bearing one color cooperating exclusively with one set of wheels, and the portion bearing the other color cooperating exclusively with the other set, a guide for record material, and means for effecting a relative displacement between the type wheels and guide to position the desired set of type wheels opposite a predetermined column of a plurality of columns on the record material.

2. In a printing mechanism for recording machines, two sets of type wheels, an inking means having two portions bearing different colors, the portion of the inking means bearing one color cooperating exclusively with one set of wheels, and the portion bearing the other color cooperating exclusively with the other set, a guide for record material, means for effecting a relative displacement between the type wheels and guide to position the desired set of type wheels opposite a predetermined part of the record material, and a selecting mechanism to control the displacing means to control the magnitude of the displacement.

3. In a printing mechanism for recording machines, two sets of type wheels, a separate impression hammer for each set, operating means for the hammers, an inking means having two portions bearing different colors, the portion of the inking means bearing one color cooperating exclusively with one set of wheels, and the portion bearing the other color cooperating exclusively with the other set, a guide for record material, means for causing a relative displacement between the type wheels and guide to position the desired set of type wheels and the record material in printing position, and a selecting mechanism to control the operation of the hammers.

4. In a printing mechanism for recording machines, two sets of type wheels, an inking means having two portions bearing different colors, the portion of the inking means bearing one color cooperating exclusively with one set of wheels, and the portion bearing the other color cooperating exclusively with the other set, a guide for record material, a row of transaction keys, and means whereby a relative displacement between the type wheels and guide is effected to position the desired set of type wheels opposite a predetermined portion of the record material, the last mentioned means including a member displaced under control of the transaction keys.

5. In a printing mechanism for recording machines, two sets of type wheels, means to always move the corresponding wheels of each set the same amount so that each set of wheels always indicates the same amount, an inking means having two portions bearing different colors, the portion of the inking means bearing one color cooperating exclusively with one set of wheels, and the portion bearing the other color cooperating exclusively with the other set, a guide for record material, and means for effecting a relative columnar displacement between the type wheels and guide whereby either set of type wheels may be in position to make a record in the proper color in a proper column on the record material.

6. In a printing mechanism for recording machines, two sets of type wheels, an inking means having two portions bearing different colors, the portion of the inking means bearing one color cooperating exclusively with one set of wheels, and the portion bearing the other color cooperating exclusively with the other set, a guide for record material, means to shift the guide so as to move the record material from one tabular position to another, and means to control the shifting means so as to bring a given column on the record material into position to receive an impression from either set of wheels as desired.

7. In a printing mechanism for recording machines, two sets of type wheels, an inking means having two portions bearing different colors, the portion of the inking means bearing one color cooperating exclusively with one set of wheels, and the portion bearing the other color cooperating exclusively with the other set, a guide for record material, means to shift the guide so as to move the record material from one tabular position to another, means to control the shifting means so as to bring a given column on the record material into position to receive an impression from either set of wheels as desired, impression taking means cooperating with the type wheels, and connections whereby the control means governs the movement of the impression taking means.

8. In a printing mechanism for recording machines, two sets of type wheels, an inking means having two portions bearing different colors, the portion of the inking means bearing one color cooperating exclusively with one set of wheels, and the portion bearing the other color cooperating exclusively with the other set, a guide for record material, and means for effecting a relative columnar displacement between the type wheels and guide to position the record material and the desired set of type wheels in printing position whereby records may be made in the proper color in proper columns on the record material.

ERNST BREITLING.